United States Patent [19]

Suzuki

[11] Patent Number: 5,255,355
[45] Date of Patent: Oct. 19, 1993

[54] DOCUMENT PROCESSOR
[75] Inventor: Tadashi Suzuki, Saitama, Japan
[73] Assignee: Fuji Xerox Co., Ltd., Tokyo, Japan
[21] Appl. No.: 594,966
[22] Filed: Oct. 10, 1990
[51] Int. Cl.$^5$ ............................................. G06F 15/38
[52] U.S. Cl. ................................ 395/145; 364/419.16
[58] Field of Search ................ 364/419; 395/145, 150, 395/151; 348/751, 735, 790; 341/28

[56] References Cited

U.S. PATENT DOCUMENTS 4,777,600 10/1988 Saito et al. .......................... 364/419

Primary Examiner—Gary V. Harkcom
Assistant Examiner—Joseph Feild
Attorney, Agent, or Firm—Finnegan, Henderson, Farabow, Garrett & Dunner

[57] ABSTRACT

The method and apparatus providing for the conversion of phonetic symbols to kanji characters. Phonetic symbols, such as kana symbols, are converted to corresponding kanji characters by inputting the phonetic symbol, converting the phonetic symbol to a kanji character corresponding to the phonetic symbol, displaying the resulting kanji character to permit confirmation of the accuracy of the conversion. Alternatively, the input phonetic symbol may be converted to a corresponding kanji character by inputting the phonetic symbol as well as the approximate number of kanji strokes corresponding to the kanji character, which corresponds to the input phonetic symbol, converting the phonetic symbol based on this input and displaying the resulting kanji character on a display apparatus for confirmation of the accuracy of the conversion process. In both cases, if the displayed kanji character is not correct, the next kanji character in the dictionary corresponding to the input phonetic symbol will be displayed.

7 Claims, 2 Drawing Sheets

DOCUMENT PROCESSOR

BACKGROUND OF THE INVENTION

1. Field of the Invention

The present invention relates to a document processor for processing a language using Chinese characters, i.e., so-called "kanji" such as in the Japanese and Chinese language, and more particularly to a document processor adapted to retrieve a desired kanji character from its corresponding phonetic "kana" symbols.

2. Discussion of the Related Art

Japanese word processors as well as work stations and computers that are capable of processing the Japanese language are in widespread use for editing Japanese sentences. Generally, such an apparatus includes a kana to kanji conversion system in which Japanese phonetic kana symbols (hereinafter referred to as the reading) are input to the processor which then generates corresponding Japanese sentences composed of "hiragana", "kanji", "katakana" and the like.

When inputting kana symbols for conversion to kanji characters by the kana to kanji conversion method, particularly when inputting a name of a person or place which may use kanji characters that are not frequently used, corresponding kanji characters may not be available in a dictionary memory used by the conversion method. This is also true when inputting the full name of a person or place. Therefore, in these cases, kana to kanji conversion is impossible. Accordingly, in such a case it is the common practice to effect single-kanji conversion in which kanji are input one by one. For instance, if the Japanese name "亻芯-" (pronounced "Kouichi" in English) is input by using kana "こういち" as a phonetic symbol, it is impossible to convert the Japanese phonetic kana symbols into a corresponding kanji name using an ordinary dictionary. Hence, the name "亻芯-" is divided into two characters "亻芯" and "-" so that it can be input sequentially, thereby completing the name "亻芯-".

With such a conventional document processor, in the case of a reading such as "こう," numerous kanji may be identified in an ordinary dictionary. In cases where such homophonic kanji exist in large numbers, if they are displayed and selected one by one, the operation until a desired set of characters is obtained becomes complicated. In addition, the time required in the selecting operation is disadvantageously long.

Accordingly, in some devices a measure is adopted in which the sequence of displaying the homophonic kanji is set as the sequence of frequency of their appearance. Although it is possible with such a technique to efficiently select popular kanji, if an attempt is made to select a kanji of a low use frequency, more time is required for the selection process.

SUMMARY OF THE INVENTION

The present invention has been made in view of the above circumstances and has as an object to provide a document processor capable of efficiently selecting a desired kanji when a corresponding kanji is selected by inputting its reading or kana symbols.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodiment and broadly described herein, the document processor in accordance with one aspect of the invention comprises a data input means for receiving input data, a phonetic symbol to kanji converting means, coupled to the data input means, for converting at least one of the phonetic symbols in the input data to a kanji character in response to a request, kanji selecting means, coupled to the phonetic symbol to kanji converting means, for selecting from among the kanji converted by the phonetic symbol to kanji converting means, a kanji character having a corresponding number of kanji strokes corresponding to the information designating the appropriate number of kanji strokes is present in the input data, and display means, coupled to the phonetic symbol to kanji converting means, for displaying a kanji converted by the phonetic symbol to kanji converting means or a kanji selected by the kanji selecting means.

That is, in accordance with the first aspect of the invention, it is made possible to include information designating the number of strokes of kanji in the data inputted for conversion by the operator, and when this information is included, a kanji selected from among the kanji each having a relevant number of strokes when the phonetic symbol to kanji conversion is effected.

In accordance with a second aspect of the invention, an arrangement is provided to permit a designation within a numerical range, such as by designating an N-number of strokes or more, an M-number of strokes or less, or not less than an N-number of strokes and not more than an M-number of strokes. Thus the selection of kanji is made possible without designating a precise number of strokes, thereby making it possible to effect the selection of kanji more efficiently.

In accordance with a third aspect of the invention, the phonetic symbol to kanji converting means is constituted by kana to kanji converting means so as to convert a kana input to kanji.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

DETAILED DESCRIPTION OF THE PREFERRED IMPLEMENTATIONS

Referring now to the accompanying drawings, a detailed description will be given of a preferred embodiment of the present invention.

Figure 1:
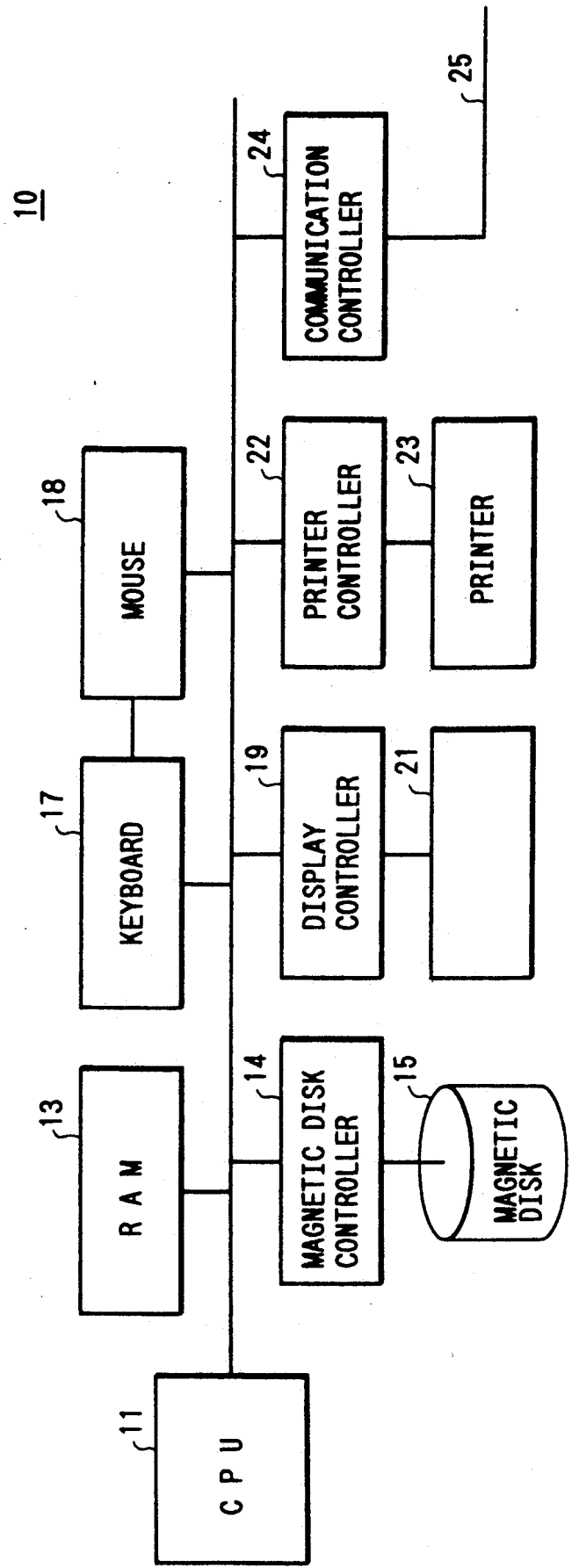
FIG. 1 is a block diagram illustrating a configuration of a document processor.

FIG. 1 illustrates an example of a circuit configuration of a document processor 10 which can be used to implement the present invention. This document processor 10 has a central processor (CPU) 11. The CPU 11 is connected to various circuit components via a bus 12. The composition and protocol of bus 12 is not important as long as it allows for communication between the various circuit components and CPU 11. Connected to bus 12 is RAM 13. RAM 13 is a random access memory, which, during the conversion operation of the document processor, stores a conversion program for controlling the apparatus and various temporary data. A magnetic disk controller 14 is also connected to the bus 12, and is arranged to control the input and output of data with respect to a magnetic disk 15 connected thereto. When the document processor is not performing conversion, the conversion program, various document data, and a dictionary for effecting phonetic symbol or kana to kanji conversion are stored in the magnetic disk 15.

Also connected to a bus 12 is a keyboard 17 which is an input device for inputting characters, codes, or numerals, and is connected to a mouse 18 serving as a pointing device. A display controller 19 is also connected to bus 12 and controls the display of video information with respect to a display 21 such as a CRT. A printer controller 22 is connected to bus 12 and controls a printer 23 for printing out a document. A communication controller 24 may also be connected to bus 12 for transmitting and receiving necessary data, via a cable 25, when the document processor 10 effects communication with another apparatus.

The configuration of the document processor 10 is presented for illustrative and explanatory purposes, it is not meant to convey that the present invention is limited to the use of a specific configuration of the document processor. It is believed, however, that the document processor 10 shown in FIG. 1 enhances the advantages of the present invention.

Figure 2:
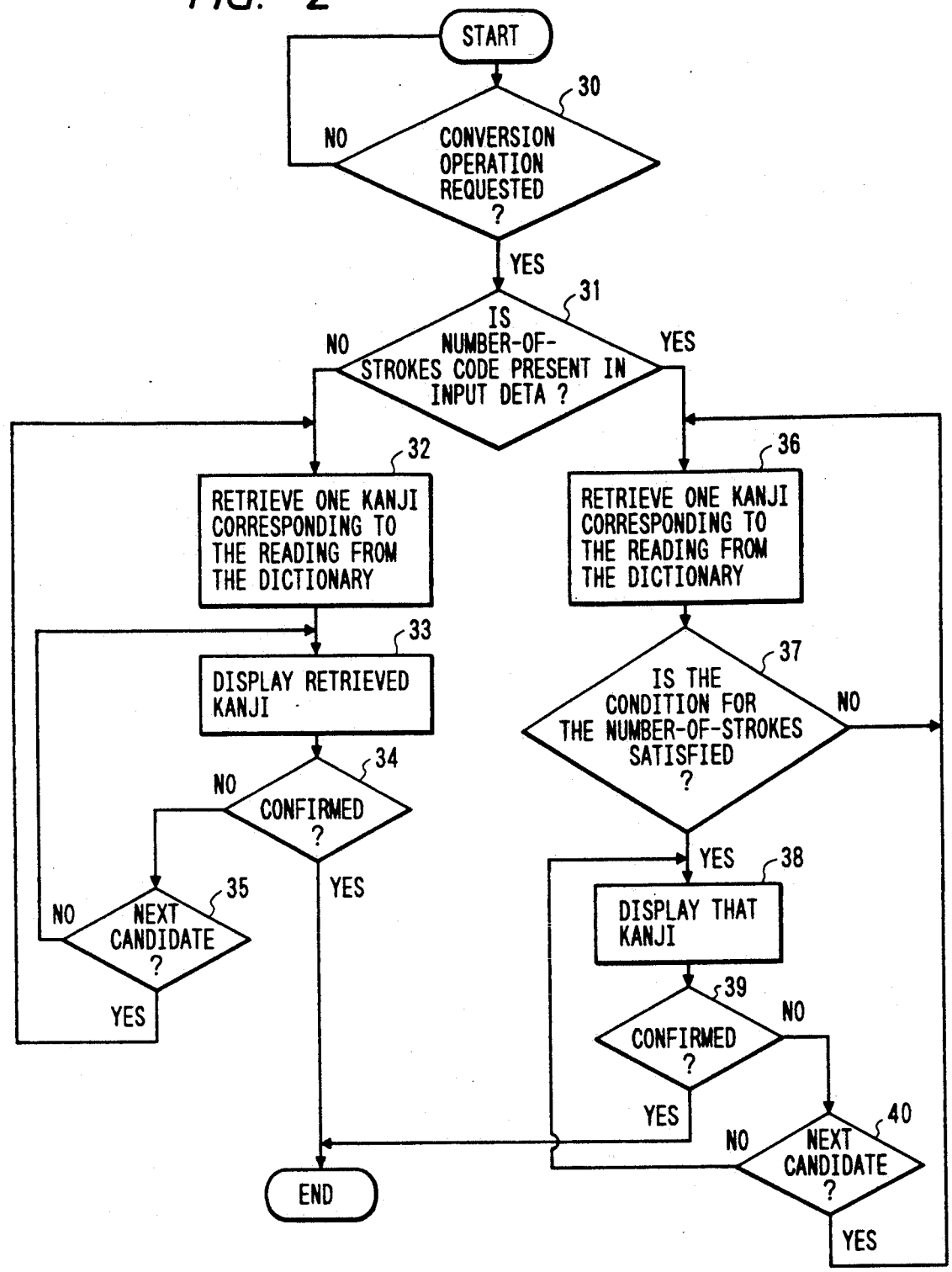
FIG. 2 is a flow diagram illustrating the flow of the kana to kanji conversion operation according to an implementation of the present invention.

FIG. 2 illustrates the flow of processing in a case where the kana to kanji conversion is effected by using the document processor shown in FIG. 1.

The CPU 11 shown in FIG. 1 begins monitoring to determine whether the operation of kana to kanji conversion has been requested (Step 30 in FIG. 2). When the operator using the document processor 10 has input kana symbols via keyboard 17 and has pressed a conversion key (not shown) on the keyboard 17, a check is made to determine whether a number-of-strokes code is included in the data (Step 31].

For example, when the kana symbols corresponding to kanji " 化 " are input by using the document processor 10, it is possible to select one of two conversion methods. In the first method, the conversion key is pressed after inputting the reading " こう " for the kanji " 化 ".

In the second method, the conversion key is pressed after inputting the reading " こう ", followed by a predetermined number-of-strokes code identifiable by the document processor 10 and the number of strokes "6" of the kanji character " 化 ". For this example, the number-of-strokes code is represented by the "*" key on the keyboard 17. With this conversion method the conversion operation is accomplished if the keys are pressed in the following order " こう *6" and then the conversion key is pressed.

First, a description will be given of the operation of the document processor 10 in a case where the number-of-strokes code "*" is not present in the input data. In this case, CPU 11 retrieves one kanji character corresponding to the input data or phonetic symbols " こう " from the dictionary (Step 32). Then, the retrieved character is displayed in a predetermined region on the display 21 (Step 33). Next, CPU 11 begins monitoring to determine whether the operator confirms the result of this conversion (Step 34) or requests the display of the next kanji character in the dictionary corresponding to the input data and capable of satisfying the conversion request (Step 35).

For example, when the CPU has retrieved a kanji character " 皇 " with respect to the reading " こう ", the operator would request the retrieval of a next candidate (Step 35). In this case, the flow returns to Step 32, and the kanji character of the next candidate or kanji character capable of satisfying the conversion request is retrieved from the dictionary. As a result, when a kanji character " 后 " is displayed (Step 33), the retrieval of a next candidate is requested again. Thus when the kanji character " 化 " is displayed, the operator presses a confirmation key (not shown) on the keyboard 17 (Step 34), and ends the operation.

Meanwhile, if it is determined in Step 31 that the number-of-strokes code is included in the input data, one kanji character corresponding to the reading " こう " is retrieved from the dictionary (Step 36). Then, a determination is made as to whether the number of strokes of the retrieved character satisfies the condition for the number of strokes inputted by the operator (Step 37). To enable this determination, information regarding the number of strokes of all kanji characters is attached to the character codes of the kanji characters stored in the dictionary and adopted by the document processor 10 in accordance with the present invention.

Figure 3:
FIG. 3 is a diagram illustrating an example the configuration of code information concerning one kanji character.

FIG. 3 illustrates the code information concerning one kanji character stored in the dictionary. Number-of-strokes information 42 representing the number of strokes of the kanji characters is attached to a character code 41 for representing the corresponding kanji characters. For instance, if the character code of the kanji character is " 伝 " is "1234", and the number of strokes is 6, then the number-of-strokes information becomes "06".

In this embodiment, since the operator has pressed the conversion key after inputting " こう *6", a determination is made in Step 37 as to whether the number-of-strokes information of the retrieved kanji character is "6". .

For example, when the kanji character " 項 " is retrieved in Step 36, it is unnecessary to display that kanji character because the number of its strokes is "12" (Step 37). Therefore , the next kanji character is retrieved from the dictionary (Step 36). On the other hand, when the result of retrieval is such kanji characters as " 王 ", " 平 ", or " 羊 " which satisfy the condition of Step 37, the retrieved kanji characters are displayed in the predetermined region on the display 21 (Step 38). Then, as with the first conversion method, if the operator presses the confirmation key, the conversion is established (Step 39). However, if he presses the next candidate key (Step 40), the operation returns to Step 36 to retrieve the next kanji character from the dictionary that corresponds to the input data and satisfies the condition of step 37. When the kanji character " 化 " is finally displayed and confirmed by the operator, the kana to kanji conversion is completed.

Although a description has been given of a case where the operator has accurately inputted the number of strokes of kanji, with the document processor 10 in accordance with this embodiment, it is possible to narrow down an object of retrieval by specifying a range, e.g., by specifying the number of strokes as being an N-number of strokes or more, an M-number of strokes or less, or not less than an N-number of strokes and not more than an M-number of strokes. For instance, in the case of the kanji character " 社 " it is possible to input "こうしゃ≧5" meaning that the kanji character to be retrieved has "5" or more strokes and then press the conversion key. Likewise, it is possible to input "こうしゃ<8" meaning that the kanji character has not more than "8" strokes and then press the conversion key. In addition, it is also possible to input "こうしゃ≧5<8" and press the conversion key so as to display relevant kanji characters. Also, by inputting "こう 4+ 7", it is possible to retrieve characters having approximately "7" strokes.

Similarly, if "こうしゃ>15" is input to the document processor 10 and the conversion operation is effected, it is possible to speedily select a kanji character "講" having a kana symbol "こう" and 20 strokes, while if a designation "こうしゃ≧10<15" is given, it is easily possible to select a kanji character " 校 " having a kana symbol "こう" and 13 strokes.

Although in the foregoing description of the implementation of the present invention has focused on the kana to kanji conversion, the present invention can be similarly applied to the case where a conversion is effected from the pronunciation of a Chinese word into kanji.

It should be noted that although characters are retrieved one by one and the result of retrieval is displayed on each such occasion, an arrangement may be alternatively provided such that the results of retrieval are stored temporarily in a predetermined area of the RAM 13 or the like, and they are displayed one by one each time the next candidate is requested.

As described above, the present invention comprises a data input means for inputting data such as a character, a numeral, or the like; phonetic symbol to kanji converting means for converting to kanji a portion of the phonetic symbol in the inputted data; kanji selecting means for selecting a kanji having a corresponding number of strokes from among the kanji converted by the phonetic symbol to kanji converting means if information designating a number of strokes is present in pre-conversion data inputted by the data input means when a conversion is effected by the phonetic symbol to kanji converting means; and display means for displaying a kanji converted by the phonetic symbol to kanji converting means or a kanji selected by kanji selecting means.

In accordance with a first aspect of the invention, since the input is effected by including the information designating the number of strokes in the data before carrying out the conversion operation by the phonetic symbol to kanji conversion means, as compared with the case where the information designating the number of strokes is inputted separately, the operation of conversion to kanji can be made simple, and an effective conversion operation can be carried out.

In addition, if the information designating the number of strokes is not included in the data, conversion is effected by another conversion operation, so that the operator is capable of selecting an operation for conversion in correspondence with the kanji character being sought.

Furthermore, in accordance with a second aspect of the invention, since the number of strokes can be designated by a numerical range, there are advantages in that the trouble involved in strictly calculating the number of strokes can be dispensed with, and that kanji can be selected speedily with respect to kanji having a particularly large number of strokes.

Moreover, in accordance with a third aspect of the invention, since the present invention is applied to the kana to kanji conversion which is widely conducted with respect to the conversion of Japanese words, there is an advantage in that conversion to kanji characters can be effected speedily in cases where an input is made by using hiragana or katakana.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended thereto, and their equivalents.

What is claimed is:

1. A document processor for converting input data to kanji characters in response to a request, the processor comprising:
   data input means for receiving the input data, said input data including at least one of characters representing a plurality of phonetic symbols and characters representing a plurality of phonetic symbols with information designating an approximate number of kanji strokes of a kanji character corresponding to the phonetic symbols;
   phonetic symbol to kanji converting means, coupled to said data input means, for converting at least one of the phonetic symbols in the input data to at least one kanji character in response to the request;
   kanji selecting means, coupled to said phonetic symbol to kanji converting means, for selecting a kanji character when the phonetic symbol to kanji converting means converts the phonetic symbol to a plurality of kanji characters, the selected kanji character having a number of kanji strokes corresponding to the input data; and
   display means, coupled to said phonetic symbol to kanji converting means, for displaying at least of one the kanji character converted by said phonetic symbol to kanji converting means and the kanji character selected by said kanji selecting means.

2. The document processor according to claim 1, wherein said input data includes characters representing a plurality of phonetic symbols, a code indicating the presence of information designating the number of kanji strokes, and information designating the approximate number of kanji strokes of the kanji character corresponding to the phonetic symbols.

3. The document processor of claim 1, wherein said plurality of phonetic symbols is in kana and said phonetic symbol to kanji converting means is a kana to kanji converting means.

4. A document processor comprised of a central processing unit, a display apparatus having a display screen, and an input apparatus, wherein said processor is capable of converting, in response to a command received by said central processing unit from said input apparatus, input data to kanji, the processor comprising:

data input means, coupled to said input apparatus, for receiving input data including at least one of characters representing a plurality of phonetic symbols and characters representing a plurality of phonetic symbols with information designating an approximate number of kanji strokes of a kanji character corresponding to the phonetic symbols;

phonetic symbol to kanji converting means, coupled to said data input means, for converting at least one of the phonetic symbols in the input data to at least one kanji character in response to the received command;

kanji selecting means, coupled to said phonetic symbol to kanji converting means, for selecting a kanji character when the phonetic symbol to kanji converting means converts the phonetic symbol to a plurality of kanji characters, the selected kanji character having a number of kanji strokes corresponding o the input data; and display means, coupled to aid phonetic symbol to kanji converting means, for displaying on the display screen of the display apparatus at least one of the kanji character converted by said phonetic symbol to kanji converting means and the kanji character selected by said kanji selecting means.

5. The document processor according to claim 4, wherein said input data includes characters representing a plurality of phonetic symbols, a code indicating the presence of information designating the number of kanji strokes, and information designating the number of kanji strokes.

6. The document processor of claim 4, wherein said plurality of phonetic symbols is in kana and said phonetic symbol to kanji converting means is a kana to kanji converting means.

7. In a data processing system, a process of converting input data to kanji characters, wherein said system includes a central processing unit, a display apparatus having a display screen, an input apparatus, and memory, the process, performed by said central processing unit, comprised of the following steps:

receiving input data which includes characters representing a plurality of phonetic symbols and information designating the approximate number of kanji strokes corresponding to said phonetic symbols from said input apparatus;

receiving a command requesting conversion of said input data;

comparing said input data with the data stored in said memory, said memory containing data identifying kanji characters, phonetic symbols corresponding to each kanji character identified in said memory, and information corresponding to an approximate number of strokes of each of the kanji characters;

selecting at least one kanji character from the data stored in said memory which corresponds to said input data;

displaying said input data on said display screen of said display apparatus;

receiving a confirmation command indicating that the selected kanji character is correct.

* * * * *

UNITED STATES PATENT AND TRADEMARK OFFICE
CERTIFICATE OF CORRECTION

PATENT NO. : 5,255,355
DATED : October 19, 1993
INVENTOR(S) : Tadashi Suzuki

It is certified that error appears in the above-indentified patent and that said Letters Patent is hereby corrected as shown below:

Column 7, line 19, change "o" to --to--.

Signed and Sealed this

Sixth Day of September, 1994

Attest:

BRUCE LEHMAN

Attesting Officer     Commissioner of Patents and Trademarks